United States Patent
Eleftheriou

(10) Patent No.: US 12,515,842 B2
(45) Date of Patent: Jan. 6, 2026

(54) FLEXIBLE CONTAINER MADE OF A PLASTIC MATERIAL, METHOD FOR MANUFACTURING SUCH A CONTAINER AND CORRESPONDING MOULD

(71) Applicant: UBLO, La Regrippière (FR)

(72) Inventor: Stylianos Eleftheriou, Marly le roi (FR)

(73) Assignee: UBLO, La Regrippière (FR)

( * ) Notice: Subject to any disclaimer, the term of this patent is extended or adjusted under 35 U.S.C. 154(b) by 0 days.

(21) Appl. No.: 18/728,934

(22) PCT Filed: Jan. 13, 2023

(86) PCT No.: PCT/EP2023/050770
§ 371 (c)(1),
(2) Date: Jul. 15, 2024

(87) PCT Pub. No.: WO2023/135268
PCT Pub. Date: Jul. 20, 2023

(65) Prior Publication Data
US 2025/0100739 A1    Mar. 27, 2025

(30) Foreign Application Priority Data
Jan. 17, 2022 (FR) ........................................ 2200352

(51) Int. Cl.
*B65D 1/02* (2006.01)
*B32B 1/08* (2006.01)
(Continued)

(52) U.S. Cl.
CPC .............. *B65D 1/0292* (2013.01); *B32B 1/08* (2013.01); *B32B 27/08* (2013.01); *B32B 27/306* (2013.01);
(Continued)

(58) Field of Classification Search
CPC .... B65D 1/0292; B65D 1/0261; B65D 1/023; B65D 1/0223; B65D 2501/0081;
(Continued)

(56) References Cited

U.S. PATENT DOCUMENTS 2,754,865 A * 7/1956 Moore .................. B65D 75/32
156/289
2,950,029 A * 8/1960 Winstead ............... B65D 11/10
D24/117
(Continued)

FOREIGN PATENT DOCUMENTS

| AU | 659617 B2 | 5/1995 |
| JP | H05294347 A | 11/1993 |

OTHER PUBLICATIONS

English translation of the Written Opinion of the International Searching Authority dated Apr. 17, 2023 for corresponding International Application No. PCT/EP2023/050770, filed Jan. 13, 2023.
(Continued)

*Primary Examiner* — Robert J Hicks
(74) *Attorney, Agent, or Firm* — David D. Brush; Westman, Champlin & Koehler, P.A.

(57) ABSTRACT

A container obtained by blow-moulding a rolled tube. The container includes a body extending, according to a longitudinal axis, between a bottom and a neck made integrally in one-piece with the body. The body has, along a height according to the longitudinal axis, a wall having a thickness between 0.05 mm and 0.4 mm. The neck has, along the height according to the longitudinal axis, a wall having a thickness between 0.4 mm and 0.8 mm.

7 Claims, 5 Drawing Sheets

(51) Int. Cl.
*B32B 27/08* (2006.01)
*B32B 27/30* (2006.01)
*B32B 27/32* (2006.01)
B29C 49/02 (2006.01)
B29K 23/00 (2006.01)
B29L 31/00 (2006.01)

(52) U.S. Cl.
CPC .............. *B32B 27/32* (2013.01); *B65D 1/023* (2013.01); *B29C 49/0691* (2022.05); *B29C 2949/0813* (2022.05); *B29C 2949/0817* (2022.05); *B29C 2949/0822* (2022.05); *B29C 2949/0831* (2022.05); *B29K 2023/06* (2013.01); *B29K 2023/086* (2013.01); *B29K 2023/12* (2013.01); *B29K 2995/0067* (2013.01); *B29L 2031/7158* (2013.01); *B32B 2307/7244* (2013.01); *B32B 2307/7376* (2023.05); *B32B 2439/60* (2013.01); *B65D 2501/0081* (2013.01)

(58) Field of Classification Search
CPC ........... B32B 1/08; B32B 27/08; B32B 27/06; B32B 27/306; B32B 27/30; B32B 27/32; B32B 2307/7376; B32B 2307/7244; B32B 2439/60; B29C 49/0691; B29C 49/06905; B29C 2949/082; B29C 2949/0822; B29C 2949/0813; B29C 2949/0831; B29C 2949/0817; B29K 2023/06; B29K 2023/0608; B29K 2023/12; B29K 2023/10; B29K 2023/086; B29K 2995/0067; B29L 2031/7158
USPC .............. 215/40, 44, 43, 382; 220/675, 669; 383/120, 118, 108, 107
See application file for complete search history.

(56) References Cited

U.S. PATENT DOCUMENTS

| | | | | |
|---|---|---|---|---|
| 4,138,026 | A | * | 2/1979 | Conklin ................ B29C 63/423 215/12.2 |
| 4,838,464 | A | * | 6/1989 | Briggs ................... B65D 23/00 215/382 |
| 2011/0303673 | A1 | | 12/2011 | Wilkes |
| 2012/0061407 | A1 | | 3/2012 | MacDonald et al. |
| 2012/0097634 | A1 | * | 4/2012 | Riedl ..................... B29B 11/06 215/379 |
| 2012/0175338 | A1 | | 7/2012 | Castillo Higareda et al. |

OTHER PUBLICATIONS

International Search Report dated Apr. 17, 2023 for corresponding International Application No. PCT/EP2023/050770, filed Jan. 13, 2023.
Written Opinion of the International Searching Authority dated Apr. 17, 2023 for corresponding International Application No. PCT/EP2023/050770, filed Jan. 13, 2023.

* cited by examiner

[Fig. 1]
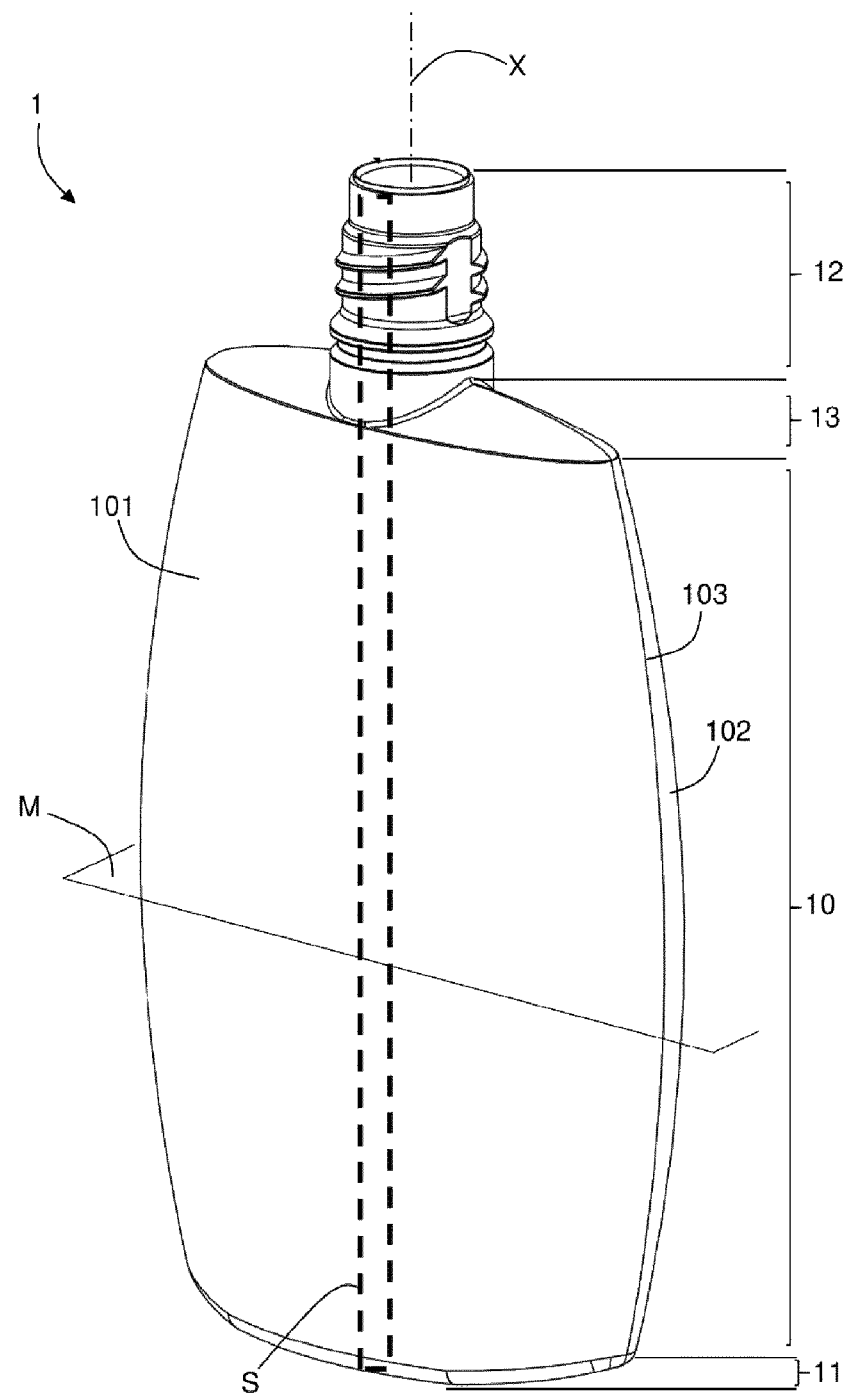

[Fig. 2]
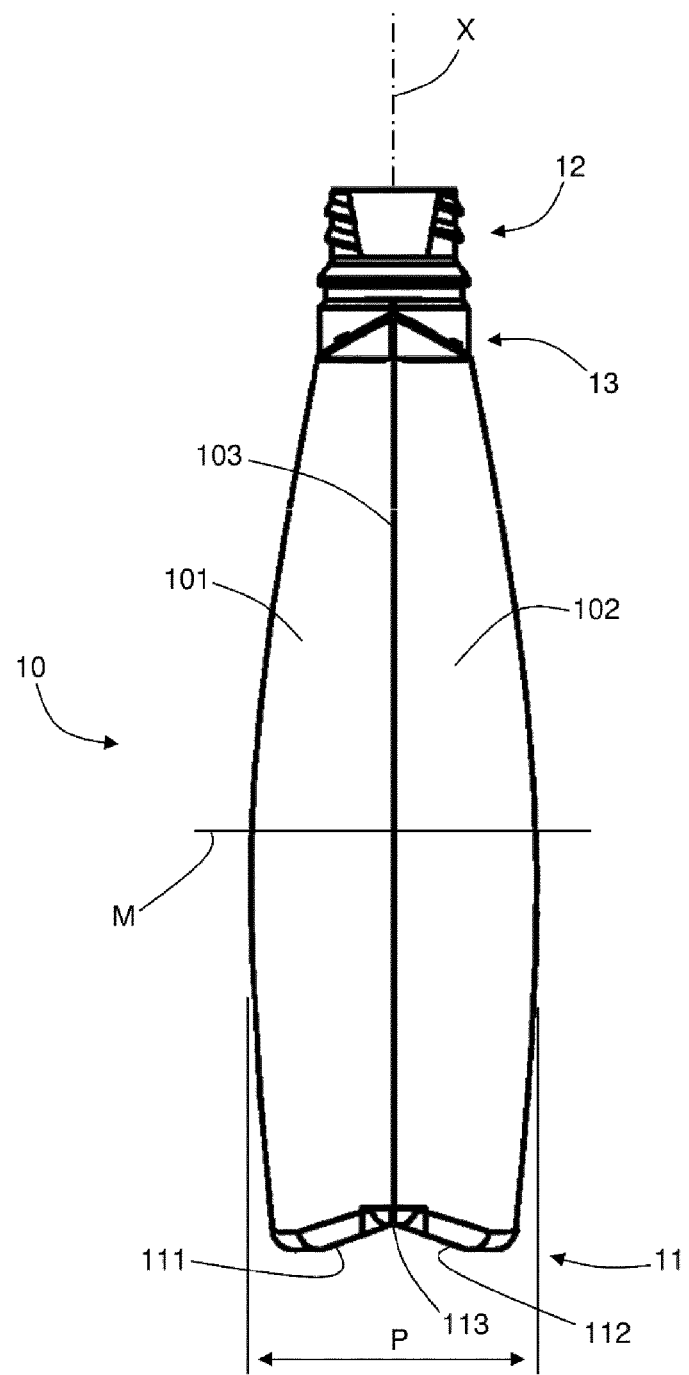

[Fig. 3]
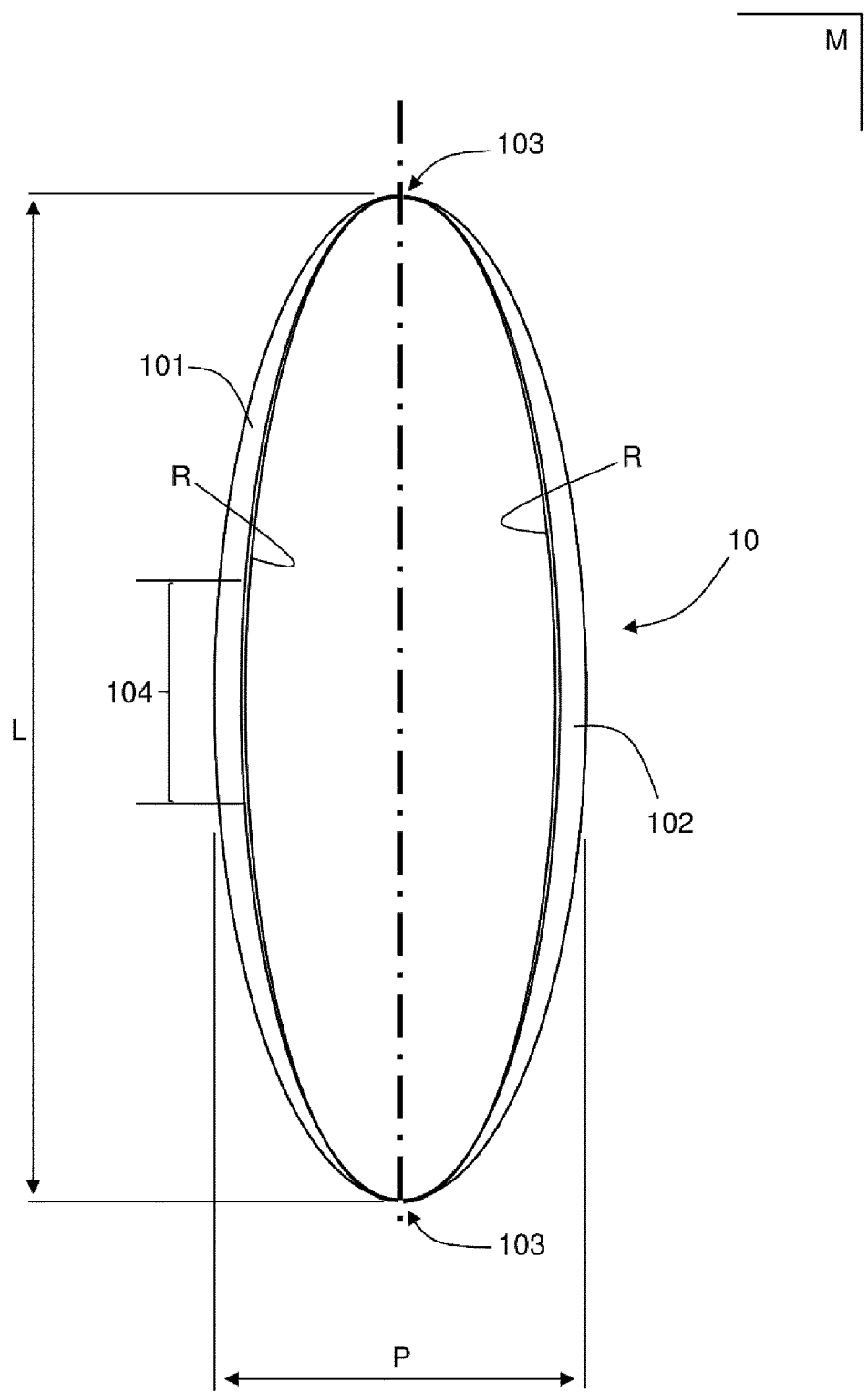

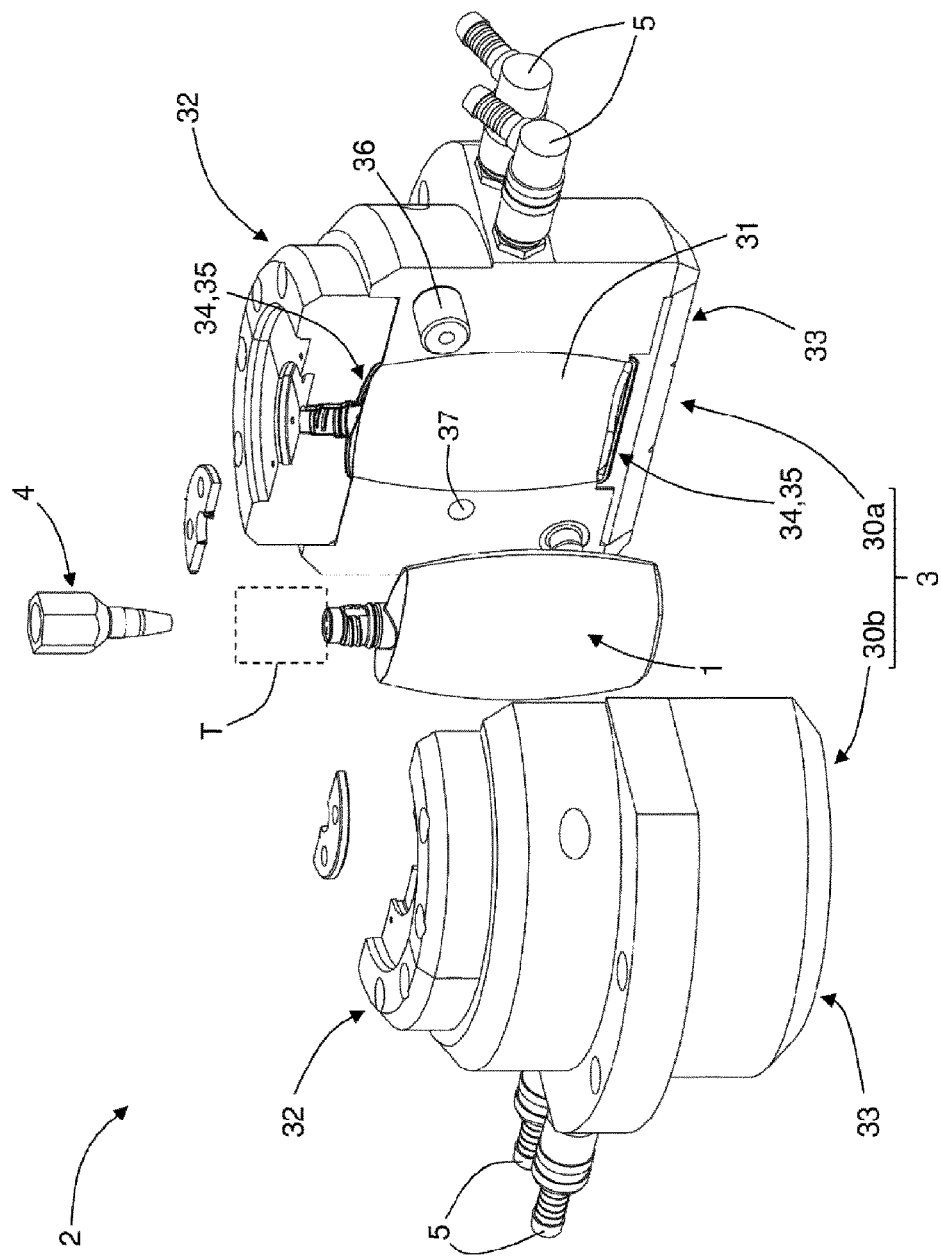

[Fig. 5]
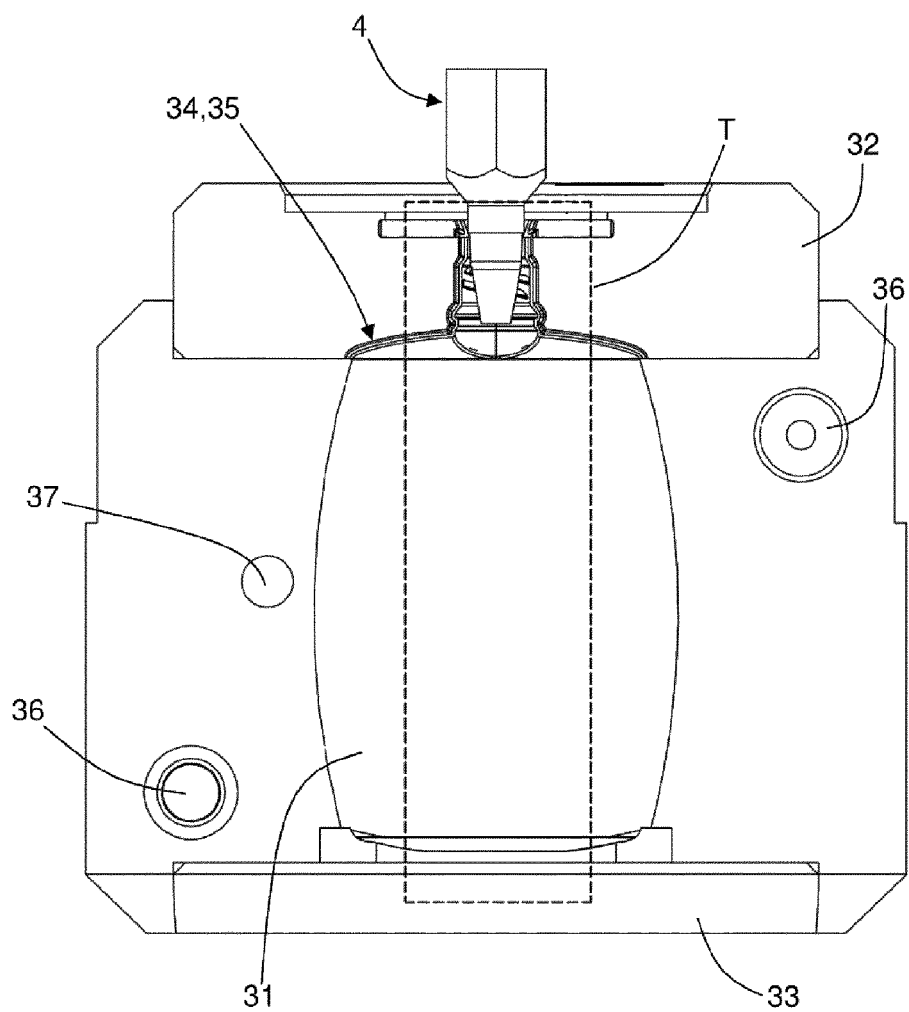

FLEXIBLE CONTAINER MADE OF A PLASTIC MATERIAL, METHOD FOR MANUFACTURING SUCH A CONTAINER AND CORRESPONDING MOULD

CROSS-REFERENCE TO RELATED APPLICATIONS

This Application is a Section 371 National Stage Application of International Application No. PCT/EP2023/050770, filed Jan. 13, 2023, and published as WO 2023/135268 A1 on Jul. 20, 2023, not in English, which claims priority to French Patent Application No. 2200352, filed Jan. 17, 2022, the contents of which are hereby incorporated by reference herein in their entireties.

FILED OF THE DISCLOSURE

The field of the invention is that of the design and manufacture of containers made of plastic for packaging products.

More specifically, the invention relates in particular to a container made of a plastic material, a method for obtaining said container as well as a mould for implementing said method.

BACKGROUND OF THE DISCLOSURE

For many years, consumption habits have considerably evolved.

Meals, which have most often been taken on table and have been times for friendliness and exchange, have shortened and have become the occasion of accumulating another activity at the same time, like watching television or reading.

This is most often visible on lunches, during which the employees take lunch while continuing to work or while shopping.

Meals have then been transformed so that the forks, knives and other utensils suitable for the consumption of products are no longer useful or almost. For example, sandwiches have quickly found their place as a replacement for meals requiring the use of tableware.

Another widespread example is observed for compotes or dessert creams which are usually packaged in jars closed by a lid. To facilitate the consumption of these products, the jars have been partially replaced by containers in the form of flexible gourds which also enable easy transport of the product to be consumed. The use of containers in the form of gourds is actually very advantageous to enable children to consume fruits during snacks, in a recreational manner.

This type of container is generally made by assembling several sheets of a complex plastic film. In general, this complex plastic film comprises a layer of polyethylene terephthalate (PET), a layer of aluminium and a layer of polyethylene (PE). The sheets are welded to one another to form a cavity in which the product to be consumed is received.

The sheets are generally provided with an oxygen barrier coating (for example aluminium), in order to avoid oxidation of the product to be consumed, this oxidation could change the nutritional qualities, the appearance and/or the taste of the product to be consumed.

The gourd containing the product to be consumed also has a neck forming a suction member.

The suction members (often referred to by their English name "spout") comprise a body from which a neck rises which forms a straw for sucking the product to be consumed.

This suction member, generally obtained by injection and/or moulding of a plastic material, is attached at the top of the cavity of the gourd and the metal sheets are welded onto the body, thereby closing the cavity.

The container filled with the product to be consumed is then hermetically sealed by sealing means which may be in the form of a lid or a cap, itself attached on the neck Nonetheless, while this type of container has a particular advantage in the ease of consumption and transport of the product, it is still complicated to manufacture and even more complicated to recycle, which results in waste treatment problems, and therefore in pollution.

Indeed, the suction member made of a plastic material should be separated from the sheets to enable the separate recycling of each of the materials. In fact, it has been found that this separation is never carried out, or almost.

Furthermore, the sheets are covered, on a first face turned towards the outside, with a printed layer enabling the display of a brand, a logo, a drawing, or a nutritional composition, for example, and, on an opposite second face turned towards the inside of the container, with the oxygen barrier coating. This coating is applied over the metal sheet and should be removed to enable good recycling of the sheet.

In fact, while the separation of the suction member with respect to the sheets could be carried out rapidly, the recycling of the sheets is more complicated because of the presence of the layer of aluminium and the inks, the sheets then being generally incinerated without being really recycled, which limits pollution only partially.

Moreover, while the barrier coating layer is large enough to protect the product from oxidation, this protection is actually not complete.

Indeed, the suction member, by its plastic material composition, remains porous to air, which might cause oxidation of the product located in the neck. Yet, it is this portion of the product which is the first to be consumed. Henceforth, the consumption of an oxidised product, even in a very small amount, could discourage a consumer who then no longer purchases this type of product, and even does not start the consumption of the container that he/she has just opened.

To overcome this drawback, co-injection with a barrier material over the suction member could then be provided, but this step proves to be difficult to implement and particularly expensive.

In addition, this type of container in the form of a gourd does not allow total consumption of the product that it contains.

Indeed, an amount of residual product remains, for example, trapped at the junctions between the different metal sheets, i.e. at the welds, and at the junction between the suction member and the metal sheets.

According to measurements that have been made, the amount of residual product, i.e. of unconsumed product, remaining inside the container once the latter has been consumed is comprised between 8 and 10% on average of the amount of product initially present in the container.

Furthermore, the manufacturing cost of containers in the form of a gourd proves to be significant and needs to be reduced.

This high cost is explained in particular by:
  the assembly of several parts to produce the gourd capable of resting in equilibrium on its bottom, namely the suction member and the different sheets;
  the amount of plastic necessary to make the suction member which should have enough surface area in order to enable welding of the metal sheets, the use of a complex aluminised film to produce the metal sheets.

Hence, it is necessary to have a machine for manufacturing the suction members, a machine for making the complex wire forming the metal sheets, and, finally, another machine for manufacturing the pouches (from the metal sheets and the suction members.

These manufacturing costs being deferred on the purchase price by consumers, these, wishing to control their budget, can then easily turn to less expensive and more environmentally-friendly products such as glass jars or conventional plastic jars even though this reduces their freedom of movement.

An exemplary aspect of the present disclosure relates to a container obtained by blowing a tube, the container comprising a body extending, according to a longitudinal axis, between a bottom and a neck made integrally in one-piece with the body, characterised in that the body has, along the height according to the longitudinal axis, a wall whose thickness is comprised between 0.05 mm and 0.4 mm, and in that the neck has, along the height according to the longitudinal axis, a wall whose thickness is comprised between 0.4 mm and 0.8 mm, and in that the tube is obtained by rolling a plastic material sheet, and in that the body defines a first facade and a second facade connected to one another by a connecting portion at each of their ends, the first facade having a weld of the rolled tube.

Thus, such a container may be obtained in a simple manner from a sheet of plastic material which is rolled into a tube and then blown.

Such a container is therefore simpler to obtain than those of the prior art, but also more environmentally-friendly since it is not necessary to separate the different elements that compose it to ensure recycling thereof. This is explained in particular by the fact that the neck and the bottom are made integrally in one-piece with the body of the container.

Furthermore, the use of the same material for the overall manufacture of the container allows limiting the operating and manufacturing costs since it is not necessary to store suction members (or its constituent material) on the one hand and of the constituent material of the pouch on the other hand.

In other words, the use of the same material and the obtainment of a container from a rolled tube enables storage of the constituent material of the containers according to the invention in the form of a plastic sheet coil (or roll).

Moreover, such thicknesses of the wall of the body allow facilitating the deformation of the container during suction of the contained product by a consumer.

In turn, the thickness of the neck allows preserving a good mechanical strength of the neck to the pressure forces exerted by the lips of the user during suction, and ensures holding of the cap, for example by screwing or clipping.

This then results in a small amount of residual product in the container after consumption.

For example, thanks to the thicknesses comprised between 0.05 and 0.4 mm for the wall of the body, a reduction comprised between 30% and 50% of the amount of residual product in comparison with the containers of the prior art has been noticed.

Furthermore, for manufacturing thereof, a container according to the invention requires a smaller amount of material in comparison with the containers of the prior art.

The tube being obtained by rolling a sheet of plastic material, it is possible to eliminate a storage space allocated to the storage of empty preforms intended to be blow-moulded to form the containers. Thus, the manufacturing costs of the container according to the invention could be reduced in comparison with the manufacture of containers from tubes already formed which should be stored while awaiting for transformation thereof into containers.

The presence of the first facade and of the second facade allows defining or conferring on the container a gourd-like shape similar to that of the gourds of the prior art, thereby facilitating the consumption of the product and limiting the amount of residual product in the container after consumption.

According to another advantageous aspect, each of the first facade and of the second facade has a thickness that decreases from a central portion towards each of the two connecting portions.

The evolution of the thickness of the first facade and of the second facade ensures, in the central portion, a significant mechanical strength enabling the user to exert a pressure in order to empty the content and facilitating the suction of the product. This also offers a quality appearance on the container for the user.

According to another advantageous aspect, the bottom has two panels articulated with respect to one another about a hinge, each panel extending between the hinge and one amongst the first facade and the second facade, the hinge connecting the two connecting portions.

Such a bottom allows facilitating the deformation of the container during suction, which favours emptying of the container, i.e. the removal of the product that it contains.

In other words, the user does not have to inject air into the container to enable the flow of the product. Hence, the user can suck in the product directly, which deforms the packaging and causes the extraction of all of the contained product, or almost.

Indeed, in combination with the small thicknesses of the wall of the body, the bottom enables a considerable deformation of the container to limit its inner volume and therefore favours the extraction of the product that it contains.

According to another advantageous aspect, the container is made of a material having oxygen-tightness properties.

This allows limiting the oxidation of the product contained in the container, from the bottom up to a mouthpiece of the neck through which the product could be extracted from the container.

Unlike the solutions of the prior art, even the product contained in the neck is protected from oxidation by air, which benefits to the nutritional quality, the appearance and the taste of the product contained in the container, and sucked in by the consumer.

According to another advantageous aspect, the neck has a diameter comprised between 8 mm and 12 mm, and a height comprised between 5 mm and 50 mm.

A neck having a diameter and a height according to the aforementioned ranges allows improving the suction of the product contained in the container.

This is explained by the fact that such a neck forms a straw allowing amplifying, inside the container, the depression induced by the suction effort of the consumer.

The invention also relates to a method for manufacturing a container as described before, the method comprising the steps of:

forming a tube by rolling and welding a sheet on itself,
inserting the tube into a mould,
closing the mould,
blowing the tube into the mould to obtain a container, the tube having a diameter strictly larger than a diameter of the neck of the container to be obtained.

Such a method allows forming a container meeting the desired criteria of pollution limitation and ease of emptying, simply and rapidly.

Moreover, by forming a tube serving as a preform for making the container, the storage space and the implementation of the method are simplified. Making a tube from a sheet allows avoiding the transport of empty preforms, thereby eliminating the required storage space.

Indeed, it is not necessary to supply a manufacturing machine with different materials to form the different elements of the container. The preforms are manufactured directly according to the manufacturing rates, by rolling a sheet on itself to form the tubes becoming the preforms for making the containers.

Furthermore, the diameter of the neck smaller than the diameter of the tube allows obtaining a resistant neck wherein the plastic material is not stretched, or almost, since it is simply crushed and preserves a thickness that is identical, or almost, to the thickness of the original sheet, in contrast with the body which is blow-moulded and whose thickness varies.

In addition, such a thickness of the neck confers a quality appearance on the container, as well as ease of consumption of the product contained in the container since, when the user sucks in, the neck does not have a tendency to crush, which would form a barrier to the flow of the product thereby preventing the consumption of product.

Preferably, prior to the step consisting in introducing the tube into a mould, the method comprises a step consisting in heating the formed tube.

Heating the tube prior to insertion thereof into the mould allows making the tube more malleable to facilitate stretching thereof, so that its constituent material matches with the moulding cavity. Thus, the obtained container has the desired shapes, to the benefit of its quality appearance.

The invention also relates to a mould for implementing the method as described before, the mould comprising two half-moulds movable relative to one another between:
- an open position in which the two half-moulds are spaced apart from one another to enable the insertion of a tube to be blown or the removal of a formed container, and
- a closed position in which the two half-moulds define therebetween a moulding cavity with the imprint of the container to be obtained,
  characterised in that the mould comprises means for cutting the constituent material of the tube, the cutting means comprising a boundary delimiting, at least partially, a contour of the moulding cavity, and a cutting surface against which the boundary bears in the closed position of the two half-moulds to cut the constituent material of the tube from which the container is formed.

Besides blow-moulding, such a mould allows directly cutting superfluous material, i.e. excess material, between the tube forming the preform and the obtained final container.

Thus, it is not necessary, upon exit from the mould, to carry out a finishing step for deburring the container thus obtained. In other words, such a mould allows forming a neck smaller than the original tube and closing the container at the lower portion, i.e. at its bottom.

Furthermore, this allows making the container rapidly by simply closing the mould which forms at least one portion of the container by crushing and cutting, the rest of the container being obtained by blowing.

According to an advantageous aspect, each half-mould integrates at least one removable insert intended to form a portion of the moulding cavity, each insert carrying part of the cutting means.

The use of a removable insert allows adapting the mould to different shapes of containers to be made.

Indeed, it is not necessary to change the entire mould to manufacture a special series, only one portion of the mould, i.e. the insert, may be changed, for example, to allow increasing the size of the neck or forming a different bottom depending on the product to be consumed or a desired design.

According to another advantageous aspect, each half-mould integrates two removable inserts including:
- a first insert intended to form at least one portion of the neck of the container, and
- a second insert intended to form at least one portion of the bottom of the container,
- each of the first insert and the second insert carrying part of the cutting means.

The use of a first insert intended to form at least one portion of the neck of the container and of a second insert intended to form at least one portion of the bottom of the container allows facilitating the production of containers according to the invention, and adapting the mould according to the type of container to be manufactured. It is herein specified that, according to current techniques, even though a mould is composed of several elements, these elements are not intended to be disassembled, the change of a portion of the mould then causing a change of the mould in its entirety.

In addition, this allows facilitating the maintenance of a manufacturing machine and in particular of the moulds since, in the event of a defect or damage to one of the moulds or a portion of the mould, only one portion of the mould could be changed.

BRIEF DESCRIPTION OF THE DRAWINGS

Other features and advantages of the invention will appear more clearly upon reading the following description of at least one preferred embodiment of the invention, given as an illustrative and non-limiting example, and from the appended drawings, wherein:

FIG. 1 is a schematic top perspective representation of a container according to the invention;

FIG. 2 is a schematic side representation of a container according to the invention;

FIG. 3 is a schematic sectional representation, according to a median transverse plane, of the container according to the invention;

FIG. 4 is a schematic top perspective representation of a container production assembly according to the invention, and FIG. 5 is a schematic front representation of a half-mould of the container production assembly according to the invention, illustrated by FIG. 3.

DETAILED DESCRIPTION OF ILLUSTRATIVE EMBODIMENTS

FIGS. 1 and 2 illustrate a container 1 according to the invention.

The container 1 comprises a body 10 extending, according to a longitudinal axis X, between a bottom 11 and a neck 12.

More specifically, the neck 12 is connected to the body 10 via a shoulder 13. Hence, this shoulder 13 connects the body 10 to the neck 12 and ensures continuity of material between two portions of the container 1, which have different dimensions, orthogonally to the longitudinal axis X.

In particular, the body 10 has dimensions larger than the dimensions of the neck 12.

According to the embodiment illustrated by FIGS. 1 and 2, the body 10 has a substantially oval shape in cross-section and the neck 12 has a substantially circular shape in cross-section.

The body 10, the bottom 11 and the neck 12 are made integrally in one-piece.

More particularly, the body 10, the bottom 11, the neck 12 and the shoulder 13 are made integrally in one-piece, i.e. they are made of the same material without assembly with one another.

Referring to FIG. 2, the body 10 defines a first facade 101 and a second facade 102 connected to each other by a connecting portion 103 at each of their ends, radially to the longitudinal axis X.

Advantageously, the connecting portion 103 extends over the shoulder 13. Advantageously, the connecting portion 103 extends up to the neck 12.

More specifically, the container 1 comprises two connecting portions 103 which face each other, and each forms a lateral edge of the container 1.

In other words, the two connecting portions 103 are spaced apart from one another by a width L defining a width of the container 1.

As shown in FIG. 1, the two connecting portions 103 are arcuate, so that the width L of the container evolves along the longitudinal axis X.

Thus, the width L increases from the neck 12 of the container 1 in the direction of the bottom 11 up to a midplane M, transverse to the longitudinal axis X, to which the width L of the container reaches its maximum size before decreasing from the midplane M in the direction of the bottom 11.

According to a direction perpendicular to the width L and orthogonally to the longitudinal axis X, the container 1 has a depth P measured between the first face 101 and the second face 102.

This depth P also evolves along the longitudinal axis X, on the one hand, and on the periphery of the wall of the body 10, between the two connecting portions 103, on the other hand.

In other words, each of the first facade 101 and the second facade 102 has a cambered profile which, combined with the arcuate shape of the connecting portions 103, makes both the width L and the depth P of the body 10 of the container 1 evolve along and orthogonally to the longitudinal axis X.

The containers 1 according to the invention are particularly suitable for containing small volumes of product, for example 50 ml, 100 ml or 200 ml.

As an illustrative and non-limiting example, a container 1 has a neck 12 having a diameter comprised between 8 mm and 12 mm for a height comprised between 5 mm and 50 mm, and a body having a maximum width L comprised between 50 mm and 54 mm, and a maximum depth P comprised between 16 mm and 20 mm. For example, the total height of the container 1, measured along the longitudinal axis X, is comprised between 70 mm and 90 mm.

As schematically illustrated by FIG. 1, the first facade 101 has a weld S. As will be explained later on, the weld S results from making of a tube T forming a preform for obtaining the container 1.

Referring to FIG. 3, the body 10 has, in height according to the longitudinal axis X, a wall whose thickness is comprised between 0.05 mm and 0.4 mm.

As shown in FIG. 3, each of the first facade 101 and the second facade 102 has a decreasing thickness from a central portion 104 towards each of the two connecting portions 103.

In other words, the thickness of the wall of the body 10, becomes thicker from a first connecting portion 103 in the direction of the central portion 104 and then becomes thinner from said central portion 104 towards the second connecting portion 103.

In turn, the neck 12 has, along the height according to the longitudinal axis X, a wall whose thickness is comprised between 0.4 mm and 0.8 mm.

Referring to FIG. 2, the bottom 11 has two panels 111, 112 articulated with respect to one another about a hinge 113.

Each panel 111, 112 extends between the hinge 113 and one amongst the first facade 101 and the second facade 102. The hinge 113 further connects the two connecting portions 103.

More particularly, the bottom 11 has:
a first panel 111 extending between the hinge 113 and the first facade 101,
a second panel 112 extending between the hinge 113 and the second facade 102.

The constituent material of the container 1 has oxygen-tightness properties. For example, these properties are obtained by the addition of a layer of barrier material (EVOH) in the base sheet, for example in the form of a sandwich comprising a layer of barrier material between the base layers.

For example, this base material is polypropylene (PP) or polyethylene (PE). The sandwich could then comprise a layer of polypropylene (PP) and a layer of polyethylene (PE), or two layers of polypropylene (PP) or polyethylene (PE).

As schematically illustrated in FIG. 3, thanks to the oxygen-tightness properties, the container 1 has a coating R intended to form a barrier to the passage of oxygen from outside the container 1 to the inside.

In FIG. 3, the oxygen barrier is schematically illustrated by a layer of barrier material, towards the inside of the container 1. The oxygen barrier is invisible to the naked eye since it has a thickness in the range of 20 µm to 30 µm on the tube T before blowing, so that the oxygen barrier is formed by the container 1 itself. In fact, the layer of barrier material is, as specified before, intermediate, i.e. it does not form an outer or inner face of the container 1.

Advantageously, this oxygen barrier is continuous over the entire height of the container 1.

In other words, the oxygen barrier extends both on the neck 12, the shoulder 13, the body 10 and the bottom 11.

Thus, the product contained in the container 1 is completely protected from oxidation by air.

Referring to FIGS. 4 and 5, a mould 3 is now described. FIG. 4 is a schematic top perspective representation of a container production assembly 2 according to an exemplary aspect of the disclosure. This mould 3 allows making containers 1 as described before.

As illustrated by FIG. 4, the mould 3 comprises two half-moulds 30a, 30b, movable relative to one another.

More specifically, the mould 3 comprises a first half-mould 30a and a second half-mould 30b which are movable relative to one another between:
an open position in which the two half-moulds 30a, 30b are spaced apart from one another, and
a closed position in which the two half-moulds 30a, 30b defining therebetween a cavity for moulding the imprint of the container 1 to be obtained.

As described later on, in the open position, the two half-moulds 30a, 30b enable the insertion of a tube T to be blown to obtain a container 1 or, on the contrary, the removal of a formed container 1.

Each half-mould 30a, 30b has a reserve 31. The combination of the reserve 31 of each of the half-moulds 30a, 30b allows forming part of the moulding cavity of the mould 3.

The mould 3 also comprises means for cutting the constituent material of the tube T forming the preform of the container 1.

The cutting means, as shown in FIGS. 4 and 5, comprise a boundary 34 delimiting, at least partially, a contour of the container 1 to be obtained, and a cutting surface 35 against which the boundary 34 bears in the closed position of the two half-moulds 30a, 30b, to cut and weld the constituent material of the tube T.

According to an embodiment illustrated by FIGS. 4 and 5, the cutting means are carried by each of the first half-mould 30a and the first half-mould 30b.

More particularly, the boundary 34 is not continuous and is carried in part by the first half-mould 30a and in part by the second half-mould 30b.

Similarly, each of the second half-mould 30b and the first half-mould 30a has a portion of the cutting surface 35. In other words, each of the second half-mould 30b and the first half-mould 30a has an alternation of boundaries 34 and cutting surfaces 35.

According to a variant not illustrated by the figures, the boundary 34 is continuous and carried by only one amongst the first half-mould 30a and the second half-mould 30b, and the cutting surface 35 is also continuous and carried only by the other one amongst the second half-mould 30b and the first half-mould 30a.

As illustrated by FIGS. 4 and 5, each half-mould 30a, 30b integrates at least one removable insert 32, 33 intended to form a portion of the moulding cavity.

Each insert 32, 33 carries part of the cutting means.

More specifically, according to the embodiment illustrated by FIGS. 4 and 5, each of the first half-mould 30a and the second half-mould 30b integrates two removable inserts 32, 33.

More particularly, each half-mould 30a, 30b integrates:
a first insert 32 intended to form at least one portion of the neck 12 of the container 1, and
a second insert 33 intended to form at least one portion of the bottom 11 of the container 1.

As mentioned before, each of the first insert 32 and the second insert 33 carries part of the cutting means.

More specifically, each of the first insert 32 and the second insert 33 carries a portion of the boundary 34.

Furthermore, each of the first half-mould 30a and the second half-mould 30b has at least one pin 36 and at least one cavity 37, each pin of the first half-mould 30a being intended to be received in a cavity 37 of the second half-mould 30b, and vice versa, each pin of the second half-mould 30b is intended to be received in a cavity 37 of the first half-mould 30a.

The cooperation between each pin 36 and a cavity 37 allows ensuring closure of the mould 3, and in particular setting of the first half-mould 30a and the second half-mould 30b in a closed position in order to form a moulding cavity with the imprint of the container 1 to be obtained.

Furthermore, the pins 36 and the cavities 37 allow guiding the passage of the mould 3 from its position or the passage of the first half-mould 30a and the second half-mould 30b from their open position into their closed position.

Finally, the first half-mould 30a and the second half-mould 30b may be connected to fluidic sources, in particular heat-transfer fluid sources intended to make a hot fluid circulate inside the mould 3 to enable heating of the mould 3 or, on the contrary, a refrigerant allowing cooling the mould 3 during the manufacture of the containers 1. In particular, this allows ensuring high production rates.

For this purpose, the mould 3 carries connectors 5, visible in particular in FIG. 4, enabling fluid communication between the fluid source(s) and the mould 3.

Obtaining a container 1 according to the invention, by means of a mould 3 as described before, is done by implementation of a method described hereinafter.

This method comprises the steps of:
forming a tube T by rolling and welding a plastic sheet on itself,
inserting the tube T into a mould 3,
closing the mould 3,
blowing in the tube T in the mould 3 to obtain a container 1.

Alternatively, the tube T could be obtained by extrusion and would then be devoid of welds S.

In this method, the tube T has a diameter strictly larger than a diameter of the neck 12 of the container 1 to be obtained.

In other words, the neck 12 is obtained by pinching the tube T between the first half-mould 30a and the second half-mould 30b, the plastic material of the tube T pinched between the first half-mould 30a and the second half-mould 30b then being cut by the cutting means, i.e. by the boundary 34 and the cutting surface 35.

Only the portion of material located in the moulding cavity could then be blown to best match with the walls of the moulding cavity.

In the moulding cavity, and in particular in the portion of the moulding cavity intended to form the body 10 of the container 1, the plastic material forming the tube T is stretched by blowing so as to match with the walls of the moulding cavity.

Stretching of the material is done radially to the longitudinal axis X of the container 1, and more in the width L of the container than in its depth P.

In other words, when the thickness of the container is measured in the central portion 104 of each of the first facade 101 and the second facade 102, the thickness of the constituent plastic material of the container is larger than in the portions located in the vicinity of the connecting portions 103.

In other words, the constituent plastic material of the tube T is more stretched along the width L of the container 1, than along its depth P.

When the tube T is formed by rolling a sheet of plastic material on itself, the weld S allowing obtaining the tube T is intended to be oriented in the mould such that it is located at the level of the central portion 104 of the first facade 101 of the body 10. In particular, the manufacturing machine may comprise a system for orienting the tube T in the mould 3, allowing orienting the weld S according to an aesthetic desire.

The bottom 11 of the container 1 is also obtained by pinching the tube T and cutting the latter by the cutting means carried in part by the second insert 33.

More particularly, pinching of the tube T between the two half-moulds 30a, 30b allows forming the hinge 113.

Once blowing is completed, the two half-moulds 30a, 30b are positioned in their open position to enable removal of the formed container 1 and insertion of a new tube T to start a new container production cycle 1.

For blowing of the tube T, a nozzle 4 is brought into said tube T in order to inject a pressurised fluid (in particular air) inside the tube T when the mould is in its closed position. The injection of air allows blowing the tube T, i.e. stretching it so that its material matches with the walls of the moulding cavity, in order to obtain the container 1.

The tube T is further pinched against the nozzle 4 by two half-disks, each secured to the first insert 32 of one amongst the first half-mould 30*a* and the second half-mould 30*b*.

Pinching of the tube T between the half-disks 5 and the nozzle causes cutting of the plastic material and therefore the separation of the container 1 from a plastic material sprue.

Furthermore, prior to the insertion of the tube T into the mould 3, the tube T is heated so as to soften its constituent material and thus enable blowing and in particular ensure that the constituent material of the tube T could match with the moulding cavity.

The method and the mould 3 that have just been described allow obtaining a container 1 formed in one single step.

More specifically, the container 1 is formed in its entirety, i.e. the body 10, the bottom 11, the neck 12 and the shoulder 13 are formed simultaneously from a plastic sheet packaged in the form of a coil.

As an illustrative and non-limiting example, the stretching coefficient, i.e. the ratio between the initial thickness of the tube T and the thickness of the wall of the body 10 of the container 1 is in the range of 1.5 to 3.

This method also allows limiting the amount of plastic material at the level of the neck 12.

Indeed, thanks to the cutting means of the mould 3, the excess material at the level of the neck 12 is removed from the final container 1.

Furthermore, the method allows obtaining a container whose neck 12, shoulder 13, body 10 and bottom 11 are airtight.

In addition, this method allows obtaining a container 1 whose neck 12 is sealed with a lip cap, for example, or with any other closure means such as a lid made of aluminium.

The container 1 according to the invention allows obtaining a behaviour similar to a gourd of the prior art consisting of aluminium sheets and a suction member made of plastic.

Nonetheless, the container 1 according to the invention could be distinguished from the gourds according to the prior art by its shape which looks rather like a bottle, but also by the fact that, when the product contained in the container 1 is consumed, the amount of residual product after consumption, i.e. the amount of product remaining in the packaging after consumption, is smaller than the amount of residual product of the gourds of the prior art.

As an illustrative and non-limiting example, the amount of residual product in a container according to the invention is in the range of 3% of the total content before consumption, in contrast with the gourds of the prior art for which the amount of residual product is generally in the range of 8%.

Indeed, thanks to the shape of its body 10, and that of its bottom 11, the container 1 could flatten to enable the extraction of product by the neck 12, that being so by simple suction from a consumer at the level of the neck 12.

Thus, the consumer does not have to interrupt his/her inspiration to enable air to enter into the container 1, favourable to the extraction of the product that it contains.

In addition, a container whose different portions (the body 10, the bottom 11, the neck 12 and the shoulder 13) are made integrally in one-piece, allows facilitating the preservation of the product in particular because each portion of the container 1 forms a barrier to the oxidation of the product by air.

Furthermore, such a container may have different shapes, for example a teddy bear, balloon or star shape, thereby facilitating, for the consumer, differentiation thereof on the shelves of supermarkets. This differentiation is impossible with current gourds.

An exemplary embodiment of the present disclosure overcomes the drawbacks of the prior art.

An exemplary embodiment provides a container that is flexible, simple to manufacture and the pollution that it could generate is limited in comparison with the containers of the prior art.

An exemplary embodiment provides such a container allowing limiting the amount of residual product, i.e. limiting the amount of product remaining in the container after consumption.

An exemplary embodiment provides such a container allowing protecting the product from a degradation of its nutritional qualities, its appearance and/or its taste.

Although the present disclosure has been described with reference to one or more examples, workers skilled in the art will recognize that changes may be made in form and detail without departing from the scope of the disclosure and/or the appended claims.

The invention claimed is:

1. A container obtained by blowing a tube, the container comprising:
    a body extending, according to a longitudinal axis, between a bottom and a neck made integrally in one-piece with the body,
    wherein the body has, along a height according to the longitudinal axis, a wall whose thickness is comprised between 0.05 mm and 0.4 mm, and the neck has, along the height according to the longitudinal axis, a wall whose thickness is comprised between 0.4 mm and 0.8 mm,
    the tube is obtained by rolling a plastic material sheet, and
    the body defines a first facade and a second facade connected to one another by a connecting portion at each of their ends, the first facade having a weld of the rolled tube.

2. The container according to claim 1, wherein each of the first facade and of the second facade has a thickness that decreases from a central portion towards each of the two connecting portions.

3. The container according to claim 1, wherein the bottom has two panels articulated with respect to one another about a hinge, each panel extending between the hinge and one amongst the first facade and the second facade, the hinge connecting the connecting portions.

4. The container according to claim 1, wherein the container is made of a material having oxygen-tightness properties.

5. The container according to claim 1, wherein the neck has a diameter comprised between 8 mm and 12 mm, and a height comprised between 5 mm and 50 mm.

6. A method for manufacturing a container, the method comprising:
    forming a tube by rolling and welding a plastic material sheet on itself;
    inserting the tube into a mould;
    closing the mould;

blowing the tube into the mould to obtain a container, the container comprising:
- a body extending, according to a longitudinal axis, between a bottom and a neck made integrally in one-piece with the body,
- wherein the body has, along a height according to the longitudinal axis, a wall whose thickness is comprised between 0.05 mm and 0.4 mm, and the neck has, along the height according to the longitudinal axis, a wall whose thickness is comprised between 0.4 mm and 0.8 mm, and
- wherein the body defines a first facade and a second facade connected to one another by a connecting portion at each of their ends, the first facade having a weld of the rolled tube;

wherein the tube has a diameter strictly larger than a diameter of the neck of the container to be obtained.

7. The method according to claim 6, wherein the method further comprises, prior to inserting the tube into the mould, heating the formed tube.

* * * * *